March 16, 1948. J. T. VAN OLDEN 2,437,770
COMBINATION IMPLEMENT
Filed Nov. 26, 1946 2 Sheets-Sheet 1
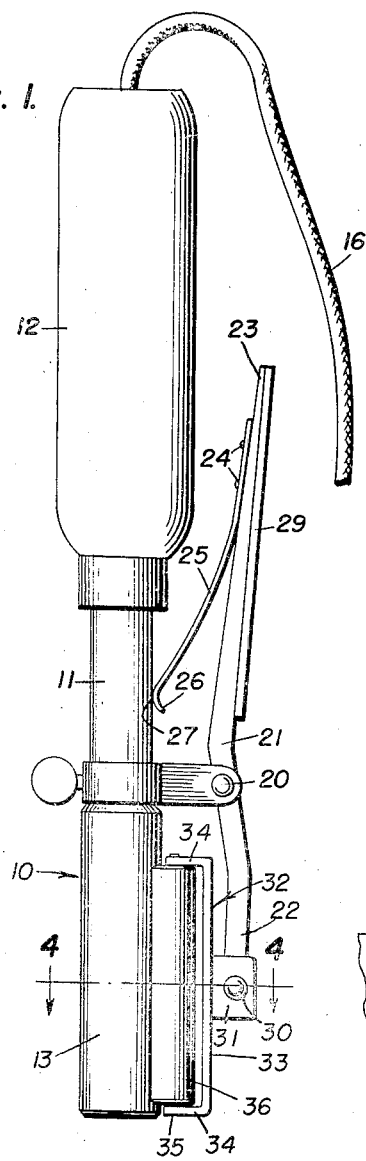
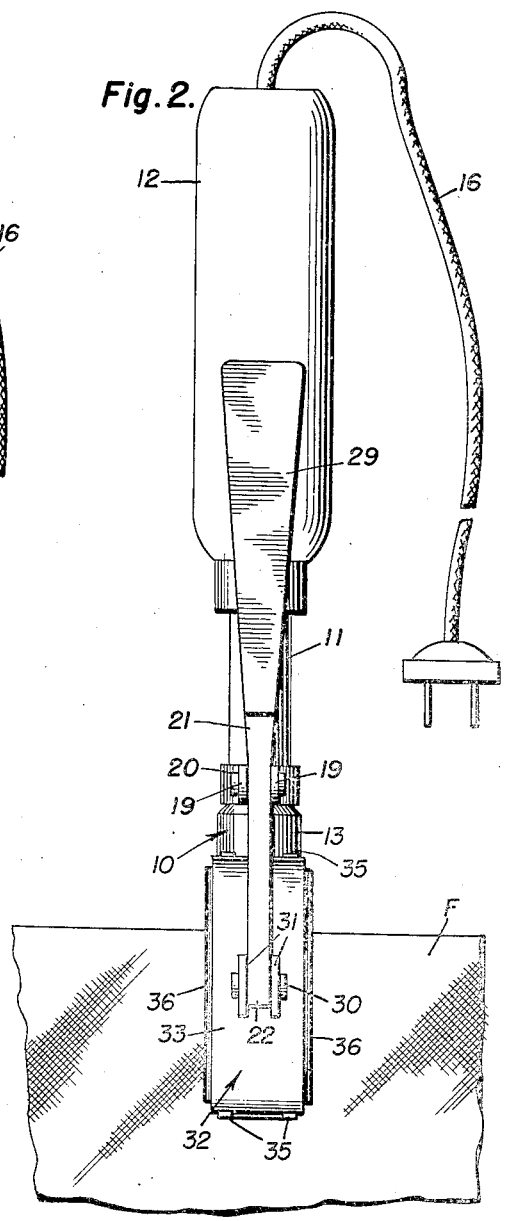
Inventor
Jacques T. Van Olden
By *Clarence A. O'Brien
and Harvey B. Jacobson*
Attorneys

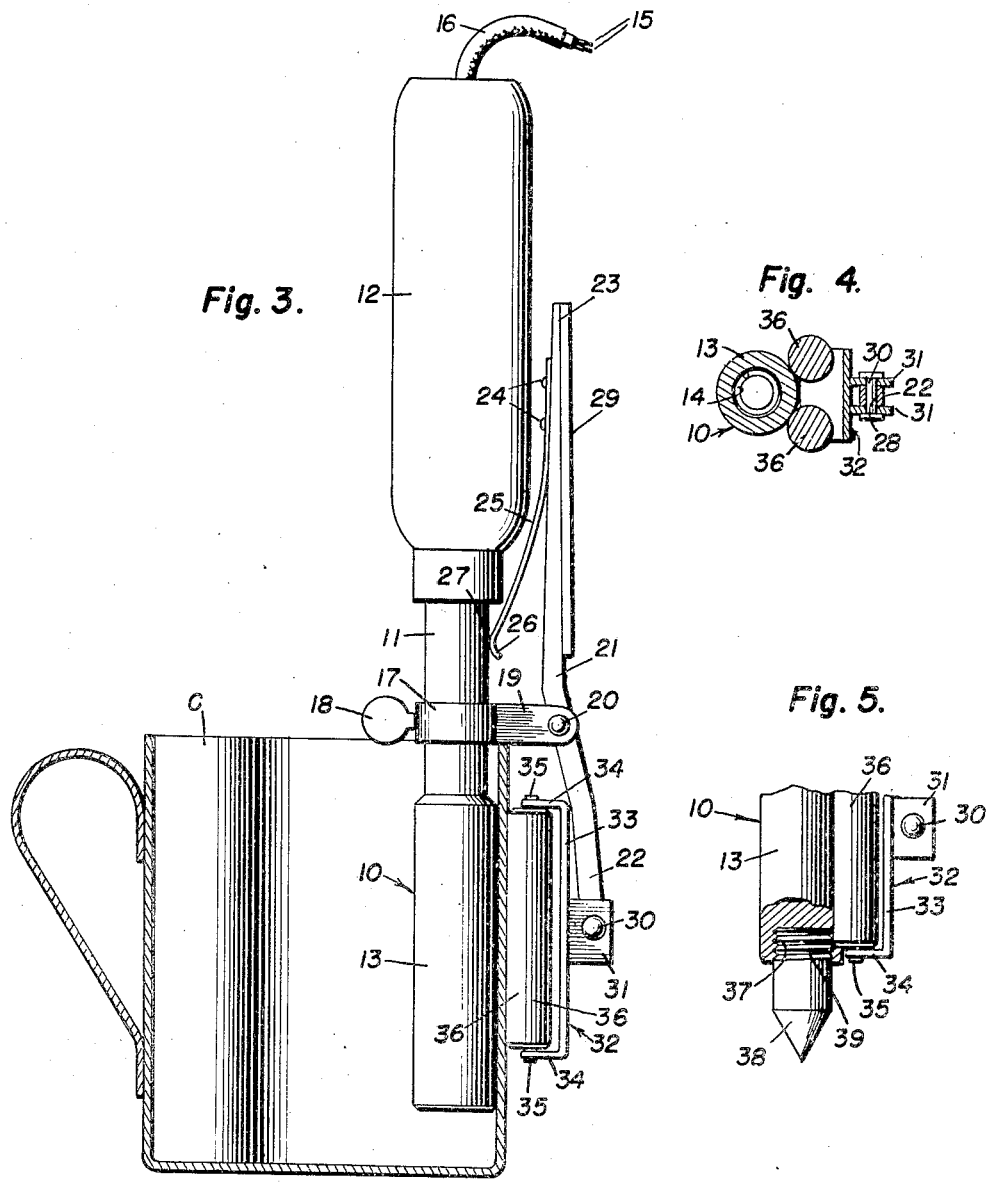

Patented Mar. 16, 1948

2,437,770

UNITED STATES PATENT OFFICE 2,437,770

COMBINATION IMPLEMENT

Jacques T. Van Olden, Durban, Natal,
Union of South Africa

Application November 26, 1946, Serial No. 712,449

3 Claims. (Cl. 219—19)

This invention relates to a combination implement and has for its primary object to serve as a water heater, a trousers creaser and soldering iron.

Another object is to contribute to the comfort and convenience to persons situated in remote areas where electric power is available but where services such as cleaning and pressing establishments, barber shops and the like are not available.

The above and other objects may be attained by employing this invention which embodies among its features an elongated circular cylindrical heater, a neck extending from one end thereof in axial alignment therewith, a handle on the end of the neck opposite the heater, a collar adjustably mounted on the neck, a set screw extending through the collar for impingement against the neck to hold the collar in adjusted position thereon, a pair of ears projecting radially from the collar, a lever pivoted intermediate its ends between the ears to swing about an axis which lies perpendicular to the longitudinal axis of the heater, a yoke pivoted to the end of the lever adjacent the heater to swing about an axis which lies parallel with the axis about which the lever swings, a roller mounted in said yoke to rotate about an axis which lies perpendicular to the axis about which the yoke swings and a spring between the end of the lever remote from the yoke and the neck yieldingly to urge the roller into peripheral contact with the heater.

In the drawings:

Figure 1 is a side view of the combination implement embodying the features of this invention;

Figure 2 is a view similar to Figure 1 taken in a plane perpendicular thereto and illustrating the device used for creasing trousers;

Figure 3 is a view similar to Figure 1 showing the device in use as a heater for heating a small body of water such as a cup;

Figure 4 is a transverse sectional view taken substantially along the line 4—4 of Figure 1, and Figure 5 is a fragmentary side view partially in section illustrating the implement equipped with a soldering tip.

Referring to the drawings in detail, an elongated circular cylindrical heater designated generally 10 is shown as equipped with an axially extending neck 11 of circular cylindrical form to the end of which is attached a suitable handle 12. The heater 10 comprises a heater casing 13 containing a suitable heating coil 14 to which the conductors 15 of a power cable 16 are attached in a conventional manner. It will be understood that the heating coil 14 is electrically insulated in any conventional manner from the heater casing 13, and that the structure of the heater 10, neck 11 and handle 12 may all be of conventional form.

Mounted for both longitudinal and rotary adjustment on the neck 11 is a collar 17 through which extends the threaded shank of a set screw 18 by means of which the collar may be held in various adjusted positions on the neck 11 and against accidental movement. Extending laterally from the collar 17 are spaced parallel ears 19 which are pierced adjacent their outer ends to receive a transversely extending pivot 20 the axis of which lies perpendicular to the longitudinal axis of the heater 10. Pivotally supported intermediate its ends on the pivot 20 is a lever 21 one end 22 of which overhangs the heater 10 while the opposite end 23 of said lever overhangs the handle 12. Riveted or otherwise attached as at 24 adjacent the end 23 of the end of the lever 21 is one end of a leaf spring 25, the opposite end of which is provided with an out-turned tongue 26 which forms in conjunction with the lever a convex bearing surface 27 which as illustrated in the drawings bears on the neck 11 in order yieldingly to urge the end 22 of the lever toward the heater 10. Formed in the end 22 of the lever 21 is a transversely extending opening 28 the purpose of which will be more fully hereinafter explained, and secured to the lever 21 adjacent the end 23 is a hand grip 29.

The axis of the opening 28 lies parallel with the axis of the pivot 20 and this opening receives a pivot 30 which extends through aligned openings formed in spaced parallel ears 31 of a yoke designated generally 32. This yoke comprises a back plate 33 from which the ears 31 project from a point substantially midway between opposite ends of the plate 33 and formed at opposite ends of the back plate 33 are out-turned arms 34 which project in a direction opposite the ears 31. The arms 34 are formed with spaced parallel openings for the reception of trunnions 35 of rollers 36, the axes of which lie perpendicular to the axis of the pivot 30, and in spaced parallel relation.

In use when the device is to be used as a trousers creaser, the cable 16 is connected with any suitable source of electric power to energize the heater 10 and upon grasping the handle 12 and squeezing the grip 29 it will be obvious that the rollers 36 will be moved out of contact with the periphery of the heater 10 so that the fabric F (Figure 2) may be introduced between the rollers and the heater so that when pressure is released on the hand grip 29 the fabric will be gripped between the heater and rollers and the creasing process may proceed. When the device is to be used as a water heater the grip 29 is again moved toward the handle 12 so as to move the rollers 36 away from the heater 10 to permit the introduction of the edge of a vessel such as a cup C containing the fluid to be heated between the rollers 36 and the heater 10 with the heater disposed on the interior of the vessel in contact with the fluid.

In the preferred form of the invention the heater casing 13 is provided at the end opposite the neck 11 with an internally screwthreaded socket 37 into which a soldering point 38 may be detachably introduced by threads 39, so that the heater 10 may be employed to heat the soldering point 38 and convert the device into a soldering iron.

While in the foregoing there has been shown and described the preferred embodiment of this invention it is to be understood that minor changes in the details of construction, combination and arrangement of parts may be resorted to without departing from the spirit and scope of the invention as claimed.

What is claimed as new is:

1. A combination implement which includes, an elongated circular cylindrical heater, a neck extending from one end thereof in axial alignment therewith, a handle on the end of the neck opposite the heater, a collar adjustably mounted on the neck, a set screw extending through the collar for impingement against the neck to hold the collar in adjusted position on the neck, a pair of ears projecting radially from the collar, a lever pivoted intermediate its ends between the ears to swing about an axis which lies perpendicular to the longitudinal axis of the heater, a yoke pivoted to the end of the lever adjacent the heater to swing about an axis which lies parallel with the axis about which the lever swings, at least one roller mounted in said yoke to rotate about an axis which lies perpendicular to the axis about which the yoke swings and a spring between the end of the lever remote from the yoke and the neck yieldingly to urge the roller into peripheral contact with the heater.

2. A combination implement which includes, an elongated circular cylindrical heater, a neck extending from one end thereof in axial alignment therewith, a handle on the end of the neck opposite the heater, a collar adjustably mounted on the neck, a set screw extending through the collar for impingement against the neck to hold the collar in adjusted position on the neck, a pair of ears projecting radially from the collar, a lever pivoted intermediate its ends between the ears to swing about an axis which lies perpendicular to the longitudinal axis of the heater, a yoke pivoted to the end of the lever adjacent the heater to swing about an axis which lies parallel with the axis about which the lever swings, a pair of rollers mounted in the yoke to rotate about spaced parallel axes which lie in a plane perpendicular to the axis about which the yoke swings and a spring attached to the lever adjacent the end remote from the yoke and bearing on the neck yieldingly to urge the rollers into peripheral contact with the heater.

3. A combination implement which includes, an elongated circular cylindrical heater casing having an axial internally screw threaded socket in one end, a circular cylindrical neck extending axially from the opposite end of the heater casing, an electrical heating coil within said casing, a handle on the neck in spaced relation to the heater casing, a power transmitting cable entering the neck through the handle, the conductors of said cable being connected to the heating coil, a collar encircling the neck for adjustment thereon, a set screw extending through the collar and impinging on the neck to hold the collar in adjusted position thereon, a pair of spaced parallel ears extending laterally from the neck, a lever pivoted intermediate its ends between the ears to swing about an axis which lies perpendicular to the longitudinal axis of the heater casing, one end of the lever overhanging the heater casing, the opposite end of said lever overhanging the handle, a yoke pivoted intermediate its ends to the end of the lever which overhangs the heater casing to swing about an axis which lies parallel with the axis about which the lever swings, a pair of spaced rollers supported in the yoke to rotate about spaced parallel axes which lie perpendicular to the axis about which the yoke swings, a handle grip carried by the lever adjacent the end which overhangs the handle and a leaf spring secured at one end to the lever beneath the handle grip with its opposite end bearing on the neck near the collar.

JACQUES T. VAN OLDEN.